Nov. 22, 1949   W. C. ROSENTHAL ET AL   2,488,741
AUXILIARY POWER TAKE-OFF FOR TRACTORS
Filed Jan. 11, 1947   2 Sheets-Sheet 2

Inventors:
William C. Rosenthal
and Ralph E. Boyle.
By Paul O. Rippel
Atty.

Patented Nov. 22, 1949

2,488,741

UNITED STATES PATENT OFFICE 2,488,741

AUXILIARY POWER TAKE-OFF FOR TRACTORS

William C. Rosenthal and Ralph C. Boyle, Chicago, Ill., assignors to International Harvester Company, a corporation of New Jersey Application January 11, 1947, Serial No. 721,516

5 Claims. (Cl. 74—15.86)

This invention concerns tractors having a power take-off shaft adapted for driving attachments of any various conventional power driven units, and more particularly concerns a power take-off unit which is itself drivable from the normal power take-off shaft when the unit is detachably mounted in association therewith upon the tractor.

An object of this invention is the provision of a power take-off arrangement wherein there is a power take-off unit detachably mountable on a tractor to receive power from an outwardly projecting power take-off shaft which is also serviceable to transmit power as a normal power take-off shaft when the unit is detached.

A further object is the provision of a detachable power take-off unit of which the casing comprises a lubricant-containing gearing chamber having a sealed bearing in a side wall thereof and a drive shaft for the gearing of said unit projecting through the sealed bearing for driving connection with the power take-off shaft of the tractor when the unit is mounted on the tractor.

Another object is the provision of a detachable power take-off unit of which a drive shaft thereof projects outwardly from a lubricant-containing casing chamber through a sealed bearing and into a tubular protective shroud which is serviceable as a means for attaching the unit to the tractor.

Still a further object is the provision of a power take-off arrangement employing a detachably mountable power take-off unit according to the preceding object, wherein the power take-off unit drive shaft is telescopically associatable with the tractor power take-off shaft to establish a driving connection therewith pursuant to placement of the unit into position for attachment to the tractor, and wherein said shroud encloses the connecting portions of the tractor power take-off shaft and of the power take-off unit drive shaft when the unit is mounted on the tractor.

The above and other desirable objects and advantages of the invention will become apparent from the ensuing description and the annexed drawings, wherein.

Figure 1:
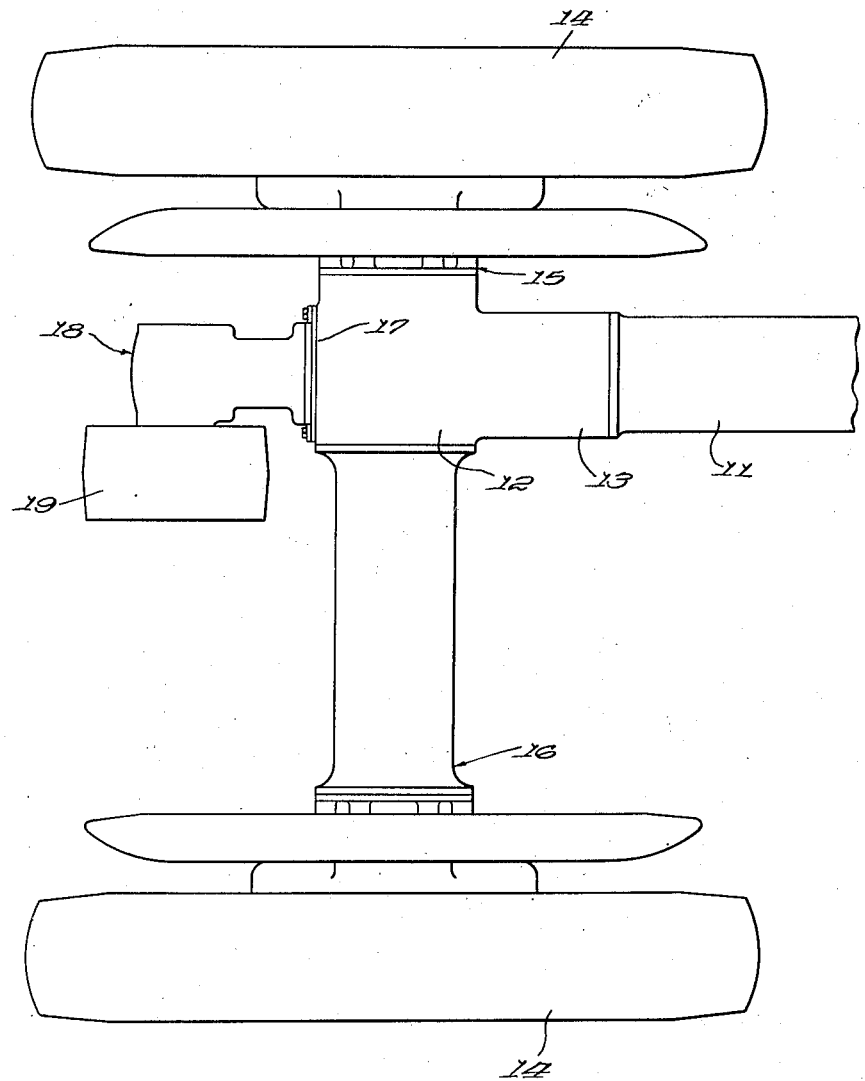
Figure 1 is a fragmentary plan view showing the rear portion and traction wheels of a tractor.

The drawings illustrate a typical installation of the present power take-off arrangement. In Figure 1 there is shown a rear body portion 11 of a wheel-type tractor. Body 11 is connected with a differential gear housing 12 through a change-speed gear box 13, and traction wheel drive axles (not shown) for driving rear traction wheels 14 are conventionally contained within driving axle housings 15 and 16.

Figure 2:
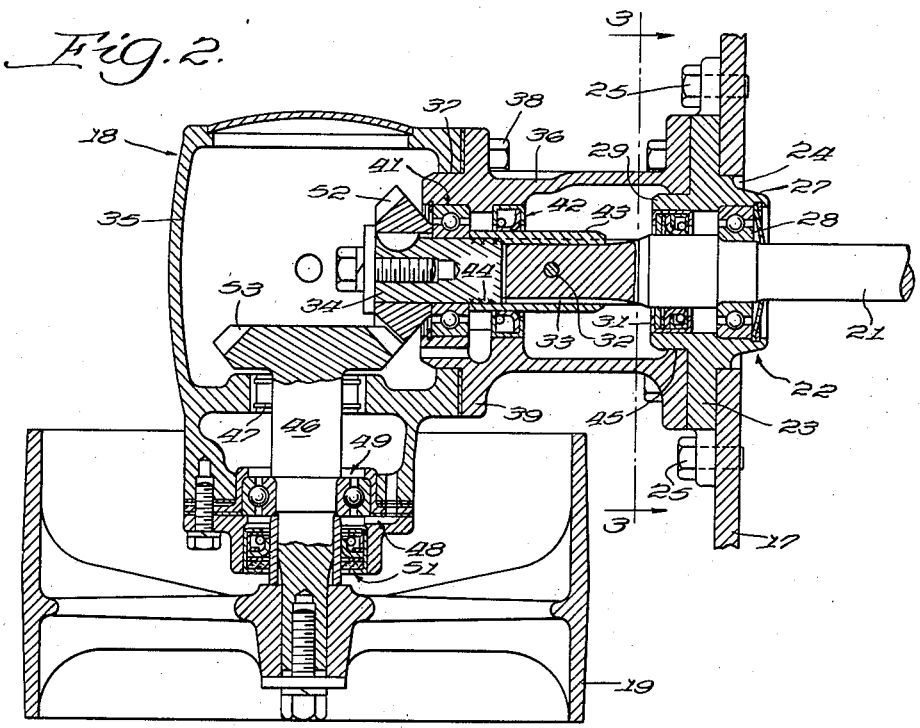
Figure 2 is a horizontal sectional view taken through a power take-off unit constituting a preferred embodiment of the present invention.
Figure 3:
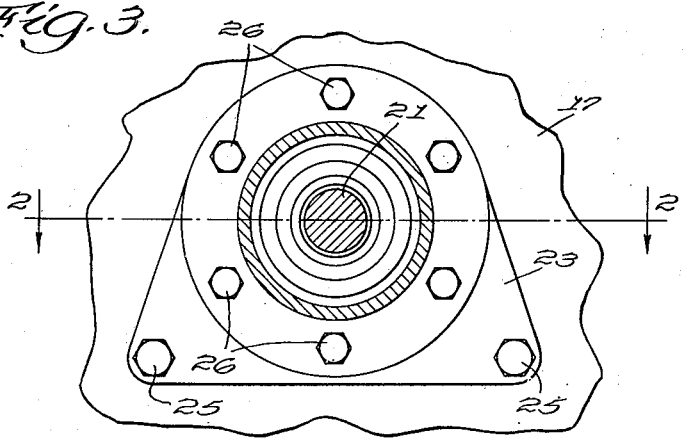
Figure 3 is a sectional view taken on the line 3—3 of Figure 2, illustrating a means for attaching the unit to the rear wall of the tractor differential gearing compartment.

A rear wall 17 of the differential housing 12, which constitutes a lubricant-containing compartment, provides support for a detachably mounted belt pulley type of power take-off unit 18. A belt pulley 19 of the mountable power take-off unit 18 receives power indirectly from a power take-off shaft 21, Figures 2 and 3, which has a portion extending exteriorly of the compartment wall 17 through a sealed bearing structure 22.

The sealed bearing structure 22 is carried by a plate 23 which is held in place over an opening 24 in the wall 17 by capscrews 25 and 26. A circular flange 27 extending about one end of an opening in the plate 23 supports a ball bearing unit 28, whereas a pilot flange 29 of the opposite side of the plate 23 encloses an annular seal device 31 to provide insurance against loss of lubricant from the lubricant-containing compartment 12 when the power take-off unit 18 is detached. When the power take-off unit 18 is detached, the outwardly projecting end portion of the power take-off shaft 21 is connectible conventionally with any type of apparatus adapted to be power driven. A hole 32 in the exterior end portion of the shaft 21 facilitates connection of apparatus with said shaft. Drive attaching means in the form of splines 33 on the shaft facilitate telescopic driving connection with a drive shaft 34 of the power take-off unit.

The power take-off unit casing includes a lubricant-containing chamber 35 and a tubular shroud 36 connected onto the front wall of the chamber 35. An opening 37 in the front side wall of the chamber 35 pilots a rear or inner end portion of the tubular shroud 36, while the capscrews 38 pass through a flange 39 of the shroud for attaching the same to the front wall of the chamber 35. A sealed bearing or bearing structure for the shaft 34 includes a ball bearing unit 41 and an annular sealing element 42. An internally splined extension 43 of the shaft 34 is brazed to the main portion of the shaft as indicated at 44. Internally splined shaft extension 43 is telescopically associated with the splined exterior portion of the power take-off shaft 21 pursuant to axial movement of the shroud 36 over the exterior portion of the shaft 21 for placing a circular interior periphery 45 of the shroud onto the pilot flange 29 in readiness for the insertion and tightening of the capscrews 26 for mounting the unit on the tractor.

A pulley shaft or power-take-off driven shaft, 46, of the power take-off unit is journaled in a bearing unit 47 and also in a sealed bearing structure 48 which includes a ball bearing unit 49 and an annular sealing device 51. The belt pulley 19 is constrained for rotation with the driven shaft 46. Power transmitting gearing in the form of bevel gears 52 and 43 constrained respectively for rotation with the shafts 34 and 46 serve to transmit driving force from the former to the latter.

An advantage of considerable importance is obtained because of no lubricant-containing chambers or compartments being exposed upon either the tractor or power take-off unit when the latter is detached from the tractor. Sealed bearings 41—42 of the power take-off unit 18 prevents leakage of lubricant into the tubular shroud 36 irrespective of whether the power take-off unit is detached to leave the exterior portion of the power take-off shaft 21 exposed for alternative attachment of other power driven equipment. When the power take-off unit is removed, the sealed bearing structure 31—28 prevents the loss of lubricant or the entry of foreign matter into the tractor differential housing 12. When the unit 18 is mounted upon the tractor, the tubular shroud 36 encloses the connected rotating portions of the shafts 21 and 34 and also provides means for mounting the unit upon the tractor.

Having described a single preferred embodiment of the invention with the view of clearly and concisely illustrating the same, we claim:

1. In a power take-off for a tractor having a lubricant-containing compartment with a sealed bearing in a side wall thereof and an exterior pilot flange circumscribing said bearing, a power take-off shaft journaled in said bearing and projecting therethrough outwardly from within said compartment to provide an exterior shaft portion capable of being coupled onto as a power transmitter, a power take-off unit comprising a casing including a lubricant-containing chamber having a side wall and also including a tubular attaching shroud projecting from such last mentioned side wall, said chamber side wall containing an opening, a sealed bearing mounted in said shroud in axial registry with the chamber side wall opening, a power take-off unit drive shaft journaled in said shroud-mounted bearing and projecting therethrough from said chamber into said shroud, said tubular attaching shroud having an inner peripheral pilot surface slidable complementally onto the pilot flange of the tractor compartment incident to mounting the power take-off unit on the tractor, and said drive shaft being telescopically attachable in driving relation with the exterior portion of the power take-off shaft pursuant to projection of the shroud into mounted relation with the tractor.

2. In a power take-off unit detachably mountable on a tractor to receive power from an outwardly projecting tractor power take-off shaft which is also serviceable to transmit power as a normal power take-off shaft when said unit is detached, a power take-off unit casing including a lubricant-containing gearing chamber having a side wall having an opening, power transmitting gearing in such chamber, a tubular attaching shroud projecting from such side wall in registry with said opening, a sealed bearing assembled rigidly relatively to said wall in registry with said opening and shroud, a power take-off drive shaft journaled in said bearing, said power-take-off drive shaft being connected with the gearing in said chamber and projecting through said bearing into said shroud, said drive shaft being telescopically attachable in driving relation with the exterior portion of said power take-off shaft pursuant to movement of the shroud into mounting attachment with the tractor, and said shroud being cooperable with the tractor for enclosing the telescopically attached portions of said shafts when the unit is mounted upon the tractor.

3. In a power take-off unit detachably mountable on a tractor to receive power from an outwardly projecting tractor power take-off shaft which is also serviceable to transmit power as a normal power take-off shaft when said unit is detached, a power take-off unit casing including a lubricant-containing gearing chamber having a side wall with a shaft-accommodating opening, power transmitting gearing in such chamber, a sealed bearing structure assembled with such side wall of said chamber and in registry with said wall opening, a power-take-off driven shaft operably connecting with the gearing in said chamber and projecting through said bearing structure, a second sealed bearing structure in a side wall of said chamber, a drive shaft journaled in the second bearing structure, said drive shaft being operably connected with the gearing and projecting through the second bearing structure, and a tubular attaching shroud projecting from said compartment in radially spaced embracing relation with the projecting portion of said drive shaft, said attaching shroud being attachable to the tractor for mounting the power take-off unit thereon, and said projecting portion of the drive shaft being adapted for driving coupling relation with said power take-off shaft pursuant to the mounting of the unit on the tractor.

4. In a power take-off unit detachably mountable on a tractor to receive power from an outwardly projecting tractor power take-off shaft which is also serviceable to transmit power as a normal power take-off shaft when said unit is detached, a power take-off unit casing including a lubricant-containing gearing chamber having a side wall, power transmission gearing in said chamber, a sealed bearing structure in such side wall of said chamber, a driven shaft journaled in said bearing structure having interior and exterior portions respectively drivingly connected with said gearing and projecting outwardly of said chamber through said bearing structure, a wall of said chamber having an opening, a tubular attaching shroud attachable to said chamber side wall in axial registration with said opening, sealed bearing means in an end portion of said shroud assembled with the chamber side wall, a power take-off drive shaft journaled in said bearing means and having an inner end portion projecting into the chamber, an element of said gearing being assembled onto the inner end portion of said drive shaft and of a diameter to be passed through said side wall opening incident to assembly or disassembly of said shroud with the chamber side wall, an outer end portion of said shroud being attachable with the tractor for mounting the power take-off unit on the tractor with the outwardly projecting power take-off shaft disposed within said shroud, and an outer end portion of said power take-off drive shaft being telescopically assemblable in driving relation with the tractor power take-off shaft pursuant to disposal of the latter into the shroud.

5. In a power take-off for a tractor having a lubricant-containing compartment with a sealed bearing in a side wall thereof, a power take-off shaft journaled in said bearing and projecting therethrough outwardly from within said compartment, said shaft having drive attaching means upon a portion thereof exterior to the compartment; a power take-off unit comprising a casing including a lubricant-containing chamber having a side wall with a shaft-accommodating opening therein, said casing also comprising a tubular attaching shroud axially registering with said opening and projecting from such chamber side wall, a sealed bearing in said casing adjacently to such chamber side wall and in axial registry with said opening and said shroud, a power-take-off-unit drive shaft journaled in the last-mentioned bearing and projecting from said chamber through said opening into said attaching shroud, said attaching shroud being projectable over and about the power take-off shaft into attaching relation with the tractor, and said drive shaft being telescopically attachable in driving relation with the exterior portion of said power take-off shaft pursuant to the projection of the shroud into position for attachment to the tractor.

WILLIAM C. ROSENTHAL.
RALPH C. BOYLE.

REFERENCES CITED

The following references are of record in the file of this patent:

UNITED STATES PATENTS

| Number | Name | Date |
|---|---|---|
| 1,090,383 | Cantrell et al. | Mar. 17, 1914 |
| 1,417,720 | Dunham | May 30, 1922 |
| 1,487,445 | Dickinson | Mar. 18, 1924 |
| 1,680,306 | Stewart | Aug. 14, 1928 |
| 1,712,190 | Yates | May 7, 1929 |
| 1,722,284 | Fisher | July 30, 1929 |